United States Patent
Kurosawa et al.

(10) Patent No.: US 6,344,073 B1
(45) Date of Patent: Feb. 5, 2002

(54) DEHUMIDIFYING MATERIAL, DEHUMIDIFYING ELEMENT AND MANUFACTURING METHOD THEREFOR

(75) Inventors: Masaji Kurosawa; Minoru Tanaka; Yuji Matsumura; Haruko Sasaki, all of Yokohama (JP)

(73) Assignee: Nichias Corporation, Tokyo (JP)

( * ) Notice: Subject to any disclaimer, the term of this patent is extended or adjusted under 35 U.S.C. 154(b) by 0 days.

(21) Appl. No.: 09/605,647

(22) Filed: Jun. 28, 2000

(30) Foreign Application Priority Data

Jun. 28, 1999 (JP) .......................................... 11-181936

(51) Int. Cl.⁷ .......................... B01D 53/04; B01D 53/28
(52) U.S. Cl. ............................ 96/135; 96/154; 55/524; 55/527; 55/DIG. 5
(58) Field of Search ......................... 96/125, 135, 153, 96/154; 55/524, 527, DIG. 5

(56) References Cited

U.S. PATENT DOCUMENTS

| | | | | |
|---|---|---|---|---|
| 5,204,068 A | * | 4/1993 | O'Loughlin et al. | 55/527 X |
| 5,300,138 A | * | 4/1994 | Fischer et al. | 96/125 |
| 5,322,537 A | * | 6/1994 | Nakamura et al. | 55/DIG. 5 |
| 5,401,706 A | * | 3/1995 | Fischer | 96/125 X |
| 5,435,958 A | * | 7/1995 | Dinnage et al. | 96/154 X |
| 5,496,397 A | * | 3/1996 | Fischer et al. | 96/154 |
| 5,580,370 A | * | 12/1996 | Kuma et al. | 96/154 |
| 5,685,897 A | * | 11/1997 | Belding et al. | 96/154 |
| 5,782,959 A | * | 7/1998 | Yang et al. | 55/DIG. 5 |

FOREIGN PATENT DOCUMENTS

| | | |
|---|---|---|
| EP | 0 471 443 A1 | 2/1992 |
| EP | 0 885 842 A1 | 12/1998 |
| JP | 53-115550 | * 10/1978 |
| JP | 03 293449 A | 12/1991 |
| JP | 10 165748 | 6/1998 |

* cited by examiner

Primary Examiner—Robert H. Spitzer
(74) Attorney, Agent, or Firm—Nixon & Vanderhye

(57) ABSTRACT

A dehumidifying material comprising: 90.0 parts by weight to 99.9 parts by weight of silicon dioxide which is silica gel; and 0.1 part by weight to 10.0 parts by weight of an iron oxide or a mixture of the iron oxide and another metal oxide and a dehumidifying element incorporating an inorganic fiber sheet supporting the dehumidifying material, the dehumidifying material being obtained by allowing alkali silicate or alkokysilane to adhere to an inorganic fiber sheet to gel the inorganic fiber sheet, by immersing the inorganic fiber sheet in solution containing iron salt or iron and other metal salt and by drying the inorganic fiber sheet.

18 Claims, No Drawings

DEHUMIDIFYING MATERIAL, DEHUMIDIFYING ELEMENT AND MANUFACTURING METHOD THEREFOR

BACKGROUND OF THE INVENTION

1. Field of the Invention

The present invention relates to a dehumidifying material capable of exhibiting excellent dehumidifying performance in a wide humidity environment range from a low humidity to a high humidity, a dehumidifying element supporting the dehumidifying material and a manufacturing method therefor.

2. Description of the Related Art

Hitherto, a honeycomb structure supporting a dehumidifying material, such as silica gel or zeolite, has widely been employed as a dehumidifying element.

When a comparison is made between silica gel and zeolite, zeolite exhibits greater quantity of dehumidification in an environment of a low humidity. In an environment of a high humidity, silica gel exhibits greater quantity of dehumidification. Therefore, use of the foregoing dehumidifying elements has separately been employed to be adaptable to the environment of the humidity.

From a viewpoint of cost reduction, silica gel can easily be prepared. Moreover, silica gel exhibits a low temperature required when it is prepared and, therefore, only a low running cost is required. Hence it follows that a considerably effective dehumidifying element can be obtained when the dehumidifying performance of silica gel can be improved in an environment of a low humidity.

SUMMARY OF THE INVENTION

In view of the foregoing, an object of the present invention is to provide a dehumidifying material capable of exhibiting excellent dehumidifying performance regardless of environment of humidity, a dehumidifying material element and a method capable of manufacturing the material and the element.

To achieve the foregoing object, according to one aspect of the present invention, there is provided a dehumidifying material comprising: 90.0 parts by weight to 99.9 parts by weight of silicon dioxide which is silica gel; and 0.1 part by weight to 10.0 parts by weight of an iron oxide or a mixture of the iron oxide and another metal oxide and a dehumidifying element incorporating a support member constituted by an inorganic fiber sheet and supporting the dehumidifying material.

To achieve the object, according to another aspect of the invention, there is provided a method of manufacturing a dehumidifying element comprising the steps of: allowing alkali silicate or alkokysilane to adhere to an inorganic fiber sheet to gel the inorganic fiber sheet; immersing the inorganic fiber sheet in solution containing iron salt or iron and other metal salt; and drying the inorganic fiber sheet.

DESCRIPTION OF THE PREFERRED EMBODIMENT

The present invention is arranged such that alkali silicate, alkoxysilane or their polymer is employed as a silica gel source. A catalyst is added to the silica gel source when reactions, such as hydrolysis, are performed so that a gel material is prepared. Then, solution (hereinafter called "metal salt solution) containing iron salt or the iron salt and another metal salt is added to the foregoing gel material to introduce metal ions into the gel. Then, the gel material is dried so that silica gel of a composite metal oxide is obtained which is a dehumidifying material according to the present invention and which is composed of the iron oxide or the composite material of the iron oxide and another metal oxide.

When a dehumidifying element is required, an inorganic fiber sheet to which alkali silicate or alkoxysilane has been allowed to adhere is gelled by performing hydrolysis in the presence of a catalyst. Then, the sheet is immersed in metal salt solution, and then the sheet is dried. Thus, the dehumidifying element incorporating the inorganic fiber sheet supporting the silica gel of a composite metal oxide can be obtained.

The inorganic fiber sheet is obtained by forming ceramic fibers or glass fibers into a sheet shape by using a binder. From a viewpoint of practical use, it is preferable that the inorganic fiber sheet is formed into a honeycomb shape.

The alkali silicate is exemplified by sodium silicate, lithium silicate, potassium silicate or their composite materials.

Alkoxysilane is a compound expressed by general formula Si $(OR^1)4$ (where $R^1$ is an alkyl group). Specifically, alkoxysilane is exemplified by tetramethoxysilane, tetraethoxysilane, tetra n-propoxysilane, tetra n-butylsilane and their polymers.

When the gelling operation is performed by using alkali silicate, acidic solution is directly added to alkali silicate. As an alternative to this, the acidic solution is added to solution in which alkali silicate is diluted with water. When the dehumidifying element is manufactured, alkali silicate is diluted with water. Then, the solution is allowed to adhere to an inorganic fiber sheet. Then, the inorganic fiber sheet is immersed in acidic solution so as to be gelled. A preferred acidic solution is solution of strong acid, such as sulfuric acid, hydrochloric acid or nitric acid.

The reaction is performed under condition that the pH is 0 to 2.5, more preferably 0 to 1.5. When the foregoing pH range is satisfied, sodium and the like in the silica gel can easily be desorbed. Moreover, deterioration in the fibers can be prevented when the inorganic fiber sheet, in particular, a glass fiber sheet is employed. The temperature at which the reactions are performed may be included in a range from 0° C. to 100° C. Since reactions are performed too fast in a hot environment, it is preferable that the temperature is about 30° C. to 60° C.

When alkoxysilane is employed, alkoxysilane is used as it is or alkoxysilane is diluted in hydrophilic organic solvent. The organic solvent is exemplified by alcohol, such as methanol, ethanol, propanol or butanol; tetrahydrofuran or dioxane. Then, hydrolysis solution containing acid, a base and water added thereto is added to the hydrophilic organic solvent to perform the gelling operation. When the dehumidifying element is obtained, solution obtained by diluting alkoxysilane with hydrophilic organic solvent is allowed to adhere to the inorganic fiber sheet. Then, the inorganic fiber sheet is immersed in the foregoing hydrolysis solution so as to be gelled. The acid to be employed is exemplified by the foregoing strong acid. The base is exemplified by sodium hydroxide, potassium hydroxide and ammonia.

The gel material or the inorganic fiber sheet supporting the gel material is cleaned, and then brought into contact with metal salt solution in a state where the inorganic fiber sheet is in the wet state. Thus, iron ions and iron ions and other metal ions are introduced into the gel. It is preferable that the metal except for iron is magnesium, zinc, copper, nickel, manganese, zirconium, aluminum or titanium.

The iron ion source is exemplified by solution containing iron salt, such as iron sulfate, iron ammonium sulfate, iron ammonium citrate or iron ammonium oxalate. Another metal ion source is exemplified by solution containing metal salt, such as magnesium sulfate, magnesium acetate, zinc sulfate, zinc acetate, copper sulfate, copper acetate, nickel sulfate, ammonium nickel sulfate, nickel acetate, manganese acetate, manganese ammonium acetate, manganese sulfate, zirconium sulfate, aluminum sulfate, titanium sulfate or titanium chloride.

When other metal ions are introduced together with iron ions, the gel material may be brought into contact with iron salt solution. Then, the gel material is brought into contact with the other metal salt solution. As an alternative to this, mixed solution of iron salt and the other metal salt may be brought into contact with the gel material. The concentration of the iron ion solution and that of the other metal salt solution may arbitrarily be determined to satisfy a range from 0.01 wt % to the saturated solubility of each solution. It is preferable that the concentration is 0.1 wt % to 20 wt %. When iron ions and other metal ions are introduced, the ratio of the two types of ions is adjusted such that other metal ions is 1 mole or lower with respect to one mole of iron ions.

Since introduction of ions above can quickly be completed, time for which contact with the gel material is established may be several minutes. To obtain a uniform material, it is preferable that the contact is established for one or more hours.

After iron ions and metal ions have been introduced, cleaning and drying are again performed. Thus, the dehumidifying material or the dehumidifying element according to the present invention can be obtained. The product is a composite material of an iron oxide and silica gel or a composite material of the iron oxide, another metal oxide and silica gel.

The product is usually dried with hot air. When freeze-drying or freeze vacuum drying is performed, drying can be performed without any breakage of pores of the gel material. Thus, a satisfactory composite material can be obtained.

EXAMPLES

Examples and a comparative example were performed to clearly describe the effects of the present invention.

Example 1

A honeycomb structure manufactured by using unwoven fabric constituted by glass fibers was immersed in a diluted solution of #3 water glass (water glass:water=2:1) so as to be impregnated with water glass. Then, the honeycomb structure was dried until the water content was about 50%. Then, the unwoven fabric impregnated with water glass was immersed in 10% sulfuric acid heated to 50° C. so that water glass was formed into hydrogel. The obtained hydrogel was cleaned, cured with dilute sulfuric acid and again cleaned. Then, the hydrogel was immersed in 10% iron sulfate heated to 50° C. for one hour, and then the hydrogel was dried.

Thus, silica gel was obtained which was iron composite silica gel composed of 99.8% of silicon dioxide and 0.2% of iron oxide. Then, a dehumidifying test of the sample was performed by a method conforming to JIS Z0701. Thus, the moisture absorption was 20.5% when the relative humidity was 20% and 34.9% when the relative humidity was 50%.

Examples 2 to 4 and Comparative Example 1

The same method as that according to Example 1 was employed except for the type and the quantity of metal salts which were varied in each of Examples 2, 3 and 4. Results were shown in Table 1. The metal salt was mixed with the iron salt without exception.

Comparative Example 1 was an example which did not contain the iron salt and metal salt.

TABLE 1

Composition of Iron Composite Silica Gel and Quantity of Dehumidification (1)

|  |  | Example 1 | Example 2 | Example 3 | Example 4 | Comparative Example 1 |
|---|---|---|---|---|---|---|
| Iron Salt | | iron sulfate | iron sulfate | iron ammonium sulfate | iron ammonium sulfate | — |
| Metal Salt Except for Iron | | — | titanium sulfate | ammonium nickel sulfate | ammonium sulfate | — |
| Composition (%) | $SiO_2$ | 98.8 | 97.5 | 98.5 | 99.6 | 100.0 |
| | $Fe_2O_3$ | 1.2 | 1.0 | 1.0 | 0.3 | 0 |
| | Metal Oxide Except for Iron | 0 | 1.5 | 0.5 | 0.1 | 0 |
| Quantity of Humidification | Relative Humidity 20%:% | 20.5 | 18.1 | 17.6 | 19.3 | 12.9 |
| | Relative Humidity 50%:% | 34.9 | 35.4 | 35.8 | 33.1 | 24.6 |
| Specific Area $m^2/g$ | | 862 | 967 | 628 | 521 | 497 |
| Pore Capacity cc/g | | 0.67 | 0.58 | 0.65 | 0.49 | 0.25 |

Example 5

A honeycomb structure manufactured by using unwoven fabric constituted by glass fibers was immersed in a dilute solution of tetraethoxysilane (tetraethoxysilane: 1,4-dioxane=1.1) so as to be impregnated with tetraethoxysilane. Then, the honeycomb structure was dried until the weight of the solvent was about 50%. Then, the unwoven fabric impregnated with tetraethoxysilane was immersed in 10% sulfuric acid heated to 50° C. so that hydrolysis of tetraethoxysilane was performed to gel the unwoven fabric. Then, the unwoven fabric was cleaned with 1,4-dioxane, and then the unwoven fabric was immersed in 1,4-dioxane solution containing 1% iron sulfate and heated to 50° C. for one hour. The sample was cooled to −30° C. so as to be coagulated and vacuum freeze-dried.

Obtained silica gel was iron composite silica gel containing 99.6% silicon dioxide and 0.4% iron dioxide. The sample was subjected to a humidifying test by a method conforming to JIS Z0701. The moisture absorption was 22.7% when the relative humidity was 20% and 37.8% when the relative humidity was 50%.

Examples 5 to 8 and Comparative Example 2

The same method as that according to Example 5 was employed such that the type and the quantity of the metal salt were Examples 6, 7 and 8 as shown in Table 2. The metal salt was mixed with iron salt so as to be added.

A sample which did not contain the iron salt and the metal salt was Comparative Examples 2.

TABLE 2

Composition of Iron Composite Silica Gel and Quantity of Dehumidification (2)

| | | Example 5 | Example 6 | Example 7 | Example 8 | Comparative Example 8 |
|---|---|---|---|---|---|---|
| Iron Salt | | iron sulfate | iron sulfate | iron ammonium citrate | iron ammonium citrate | — |
| Metal Salt Except for Iron | | — | copper sulfate | zirconium sulfate | manganese acetate | — |
| Composition (%) | $SiO_2$ | 99.6 | 98.9 | 99.1 | 97.6 | 100.0 |
| | $Fe_2O_3$ | 0.4 | 0.7 | 0.8 | 1.4 | 0 |
| | Metal Oxide Except for Iron | 0 | 0.4 | 0.1 | 1.0 | 0 |
| Quantity of Humidification | Relative Humidity 20%:% | 22.7 | 20.9 | 23.1 | 19.5 | 15.7 |
| | Relative Humidity 50%:% | 37.8 | 38.5 | 36.3 | 33.0 | 27.9 |
| Specific Area $m^2/g$ | | 1124 | 1257 | 954 | 771 | 623 |
| Pore Capacity cc/g | | 0.72 | 0.65 | 0.69 | 0.56 | 0.44 |

As shown in Tables 1 and 2, the dehumidifying material and the dehumidifying element having the structure that iron and other metal have been introduced into silica gel has satisfactory dehumidifying performance in low and high humidity environments as compared with sole silica gel. When both of iron and other metal are simultaneously employed, the dehumidifying performance can be improved as compared with a case where only iron is employed.

As described above, according to the present invention, the dehumidifying material and dehumidifying element having satisfactory dehumidifying performance regardless of the humidity environment can be obtained. Since low-cost silica gel is employed as the base material and only a simple manufacturing process is required, the manufacturing cost can be reduced.

What is claimed is:

1. A dehumidifying material comprising: 90.0 parts by weight to 99.9 parts by weight of silicon dioxide which is silica gel; and 0.1 part by weight to 10.0 parts by weight of an iron oxide or a mixture of the iron oxide and another metal oxide.

2. A dehumidifying material according to claim 1, having a structure of a composite of silica gel; and any one of the iron oxide or a mixture of the iron oxide and another metal oxide.

3. A dehumidifying element comprising: a support member constituted by an inorganic fiber sheet and arranged to support a dehumidifying material which incorporates 90.0 parts by weight to 99.9 parts by weight of silicon dioxide which is silica gel; and 0.1 part by weight to 10.0 parts by weight of an iron oxide or a mixture of the iron oxide and another metal oxide.

4. A dehumidifying element according to claim 3, wherein said inorganic fiber sheet is a sheet obtained by forming ceramic fibers or glass fibers into a sheet shape by using a binder.

5. A dehumidifying element according to claim 4, wherein said inorganic fiber sheet has a honeycomb shape.

6. A dehumidifying element according to claim 3, having a structure of a composite of silica gel; and the iron oxide or a mixture of the iron oxide and another metal oxide.

7. A method of manufacturing a dehumidifying element comprising the steps of: adhering alkali silicate or alkokysilane to an inorganic fiber sheet to gel said inorganic fiber sheet;

immersing said inorganic fiber sheet into a solution to make said inorganic fiber sheet contain iron salt or iron and other metal salt; and drying said inorganic fiber sheet.

8. A method of manufacturing a dehumidifying element according to claim 7, wherein said immersing step comprises; a step of immersing said inorganic fiber sheet in solution containing iron salt or iron and other metal salt.

9. A method of manufacturing a dehumidifying element according to claim 8, wherein said immersing step comprises:

a first step of immersing said inorganic fiber sheet in solution containing iron salt; and a second step of immersing said inorganic fiber sheet in solution containing other metal salt.

10. A method of manufacturing a dehumidifying element according to claim 7, wherein said alkali silicate is anyone selected cysodium silicate, lithium silicate, potassium silicate or their composite materials.

11. A method of manufacturing a dehumidifying element according to claim 7, wherein said alkoxysilane is anyone selected from tetramethoxysilane, tetraethoxysilane, tetra n-propoxysilane, tetra n-butylsilane and their polymers.

12. A method of manufacturing a dehumidifying element according to claim 7, wherein said adhering step comprises adhering alkali silicate to an inorganic fiber sheet and a step of gelling by an acidic solution.

13. A method of manufacturing a dehumidifying element according to claim 12, wherein the gelling step is performed under condition that the pH is 0 to 2.5.

14. A method of manufacturing a dehumidifying element according to claim 12, wherein the gelling step is performed under condition that the pH is 0 to 1.5.

15. A method of manufacturing a dehumidifying element according to claim 12, wherein the gelling step is performed at 30–60° C.

16. A method of manufacturing a dehumidifying element according to claim 7, wherein the gelling step comprises the steps of:

immersing said inorganic fiber sheet into the solution obtained by diluting alkoxysilane with hydrophilic organic solvent; and immersing the inorganic fiber sheet in the foregoing hydrolysis solution so as to be gelled.

17. A method of manufacturing a dehumidifying element according to claim 7, wherein said inorganic fiber sheet is a sheet obtained by forming ceramic fibers or glass fibers into a sheet shape by using a binder.

18. A method of manufacturing a dehumidifying element according to claim 7, wherein said inorganic fiber sheet has a honeycomb shape.

* * * * *